C. SMYRSKI.
SHOCK ABSORBING WHEEL.
APPLICATION FILED MAR. 13, 1916.

1,184,885.

Patented May 30, 1916.

Inventor
C. Smyrski

By A. M. Wilson
Attorney

UNITED STATES PATENT OFFICE.

CARL SMYRSKI, OF PHILADELPHIA, PENNSYLVANIA.

SHOCK-ABSORBING WHEEL.

1,184,885. Specification of Letters Patent. Patented May 30, 1916.

Application filed March 13, 1916. Serial No. 83,847.

*To all whom it may concern:*

Be it known that I, CARL SMYRSKI, a subject of the Emperor of Austria-Hungary, residing at Philadelphia, in the county of Philadelphia and State of Pennsylvania, have invented certain new and useful Improvements in Shock-Absorbing Wheels, of which the following is a specification.

This invention relates to new and useful improvements in shock absorbing wheel.

The primary object of the present invention is the provision of a wheel having a resiliently floated hub acting as a shock absorber for the vehicle axle carried thereby, the entire rim portion of the wheel being non-resilient and of extremely strong construction adapting the same for heavy truck service such as army use. It is also designed in the present arrangement of wheel having a floating hub, to provide a spring mounting that may be formed of a single endless resilient wire coiled into helical formations interposed between the hub and felly members.

Another object of the device is to provide a wheel of great strength having few parts and resiliently mounting the axle supporting member thereof in a manner to prevent any excessive torsion strains or dishing of the wheel structure.

With these general objects in view and others that will appear as the nature of the invention is better understood, the same consists in the novel combination and arrangement of parts hereinafter fully described, illustrated in the accompanying drawings and then claimed.

Figure 1:
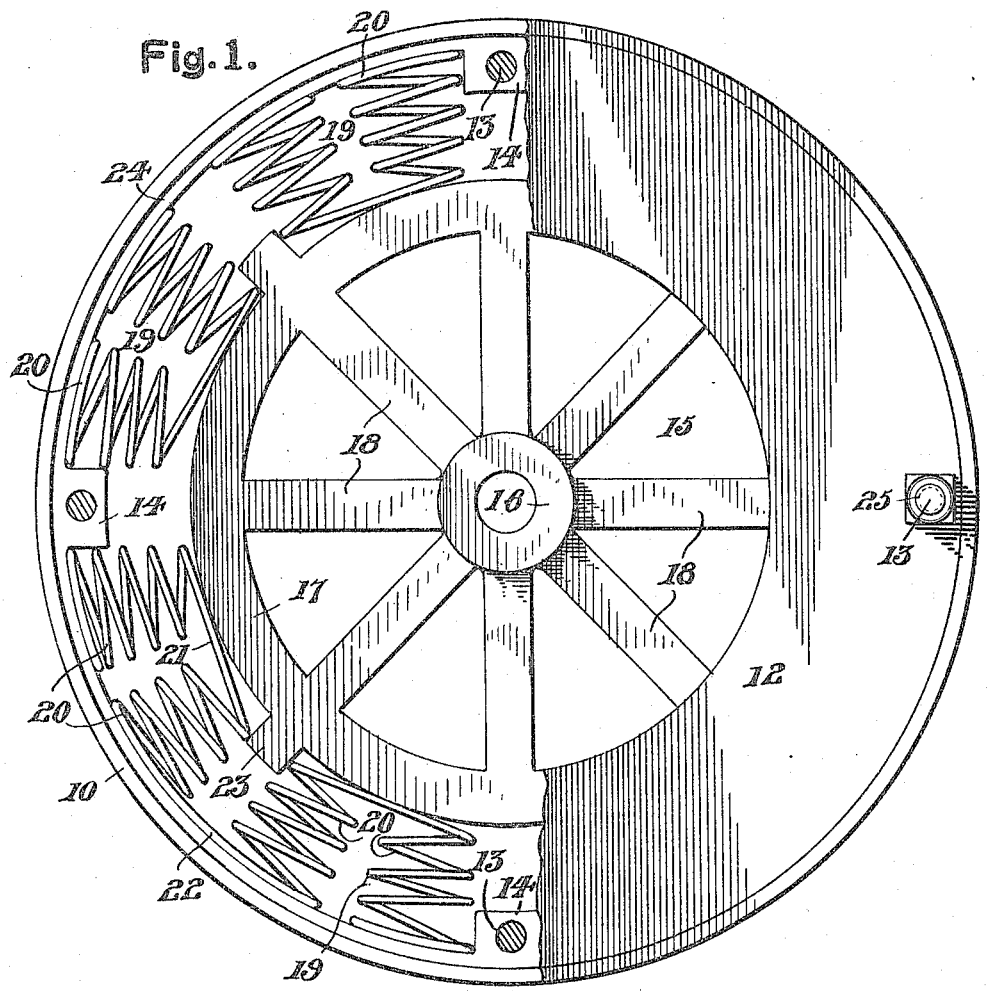
Figure 2:
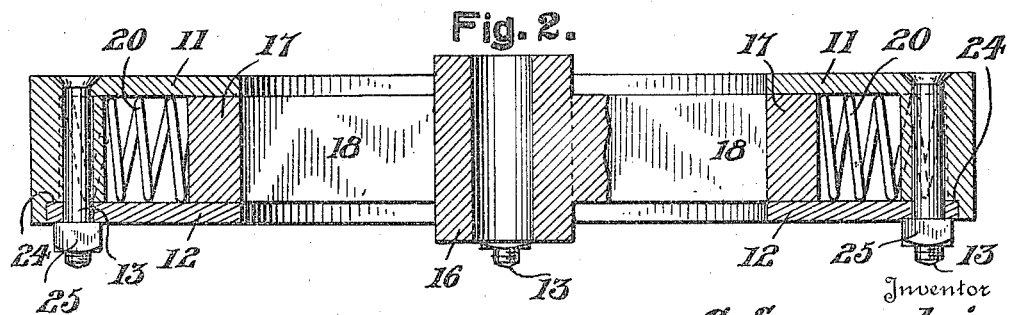

In the drawings forming a part of this application and in which like designating characters refer to corresponding parts thoughout the several views:—Figure 1 is a side elevation of the device with the removable plate thereof partially broken away, and Fig. 2 is a transverse radial sectional view thereof.

The present invention contemplates a metallic rim 10 having one integral inwardly extending flange 11 and an opposite similar flange 12, which latter is removable being in the nature of an annular plate normally secured in position by means of bolts 13 extending through the said flanges 11 and 12 and intermediately arranged bosses 14 carried by the inner side of the rim 10. An auxiliary or mounting wheel 15 having a hub 16, a rim 17 and connecting spokes 18 is shiftably arranged between the flanges 11 and 12 normally positioned concentric with the main rim 10 by means of a spring device 19.

The spring devices 19 constitute an important feature of the invention and are preferably arranged four in number each being formed of a single piece of resilient wire coiled into four cushioning helices 20, the outer two helices being connected together at their inner lesser ends by means of wire portions 21 while the central two helices 20 are connected together at their outer enlarged ends by a connecting wire portion 22. Each spring device thus formed of quadruple coils is seated between the rims 10 and 17 and retained in place by the bosses 14 engaging the outer surfaces of the end coils, while outwardly projecting radially arranged stub spokes 23 are positioned between the inner pair of coils 20 of each spring device 19, as best illustrated at the lower side of Fig. 1 of the drawings.

In assembling the device the auxiliary wheel 15 is arranged concentrically within the rim 10 flatly engaging the inner face of the flange 11 and the spring devices 19 are sprung into place between the rims 10 and 17 in locking engagement between the bosses 14 and stub spokes 23. The removable flange or plate 12 is then positioned upon the bosses 14 and within an annular groove 24 of the rim 10 while bolts 13 are positioned through the flanges 10 and 12 as well as the bosses 14 and are secured in place by the lock nuts 25.

It will be evident that upon applying weight to the hub 16 such as by means of a vehicle axle (not shown), the wheel 15 bearing upon the spring members 19 will depress such members positioned at the lower side of the wheel while those arranged at the upper side thereof will be correspondingly released allowing the same to slightly expand and whereby the wheel 15 is resiliently floated during the travel of the vehicle which is supplied with such wheel. The gyratory movement of the wheel 15 with respect to the rim 10 slidably moves the rim 17 relatively inwardly and outwardly of the flanges 11 and 12 between which the same slightly contacts, it being noted that the stub spokes 23 aside from positioning the spring members 19 act as guides by bearing against the inner faces of the flanges 11 and 12 preventing any possible displacement of the wheel 15 during the operation thereof.

It will thus be apparent that a resilient wheel structure is provided which possesses extreme strength both with respect to the floating axle mounting member 15 and the traction rim 11, while the entire device including the present form of spring members employed only a few parts in its construction.

While the form of the invention herein shown and described is what is believed to be the preferable embodiment thereof, it is nevertheless to be understood that minor changes may be made in the form, proportion and details of construction without departing from the spirit and scope of the invention as hereinafter claimed.

What I claim as new is:—

A wheel comprising a rim having an inwardly projecting integral flange at one edge thereof, a removable annular plate flange secured to the said rim in parallelism with the said integral flange, spaced bosses projecting radially inwardly of the said rim connecting the said flanges, a floating wheel normally concentric with the said rim shiftably fitted between the said flanges, spring members formed of single pieces of resilient wire bent into quadruple helices attached together arranged between the said bosses contacting the said rim and floating wheel, outwardly projecting radially arranged stub spokes upon the said floating wheel guidingly positioned between the said flanges in positioning engagement with respect to the central inner portions of the said spring members.

In testimony whereof I affix my signature.

CARL SMYRSKI.

Copies of this patent may be obtained for five cents each, by addressing the "Commissioner of Patents, Washington, D. C."